United States Patent
Gaza et al.

(10) Patent No.: US 9,569,493 B2
(45) Date of Patent: *Feb. 14, 2017

(54) AVOIDANCE OF INTERMEDIATE DATA SKEW IN A MASSIVE PARALLEL PROCESSING ENVIRONMENT

(71) Applicant: International Business Machines Corporation, Armonk, NY (US)

(72) Inventors: Lukasz Gaza, Jankowice (PL); Artur M. Gruszecki, Cracow (PL); Tomasz Kazalski, Cracow (PL); Grzegorz S. Milka, Janow (PL); Konrad K. Skibski, Cracow (PL); Tomasz Stradomski, Bedzin (PL)

(73) Assignee: International Business Machines Corporatin, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/144,893

(22) Filed: Dec. 31, 2013

(65) Prior Publication Data

US 2015/0186465 A1 Jul. 2, 2015

(51) Int. Cl.
*G06F 17/30* (2006.01)
(52) U.S. Cl.
CPC ..... *G06F 17/30466* (2013.01); *G06F 17/3033* (2013.01); *G06F 17/30469* (2013.01); *G06F 17/30498* (2013.01); *G06F 17/30501* (2013.01)
(58) Field of Classification Search
CPC ............... G06F 17/30466; G06F 17/30498
USPC ......................................................... 707/718
See application file for complete search history.

(56) References Cited

U.S. PATENT DOCUMENTS

| | | | |
|---|---|---|---|
| 7,085,769 B1* | 8/2006 | Luo | G06F 17/30445 |
| 7,818,349 B2 | 10/2010 | Frost | |
| 8,055,651 B2 | 11/2011 | Barsness et al. | |
| 2004/0260675 A1* | 12/2004 | Bruno | G06F 17/30333 |
| 2009/0248617 A1* | 10/2009 | Molini | G06F 17/30466 |
| 2010/0049722 A1* | 2/2010 | Xu | G06F 17/30466 |
| | | | 707/764 |

(Continued)

FOREIGN PATENT DOCUMENTS

| | | |
|---|---|---|
| CN | 104750770 A | 7/2015 |
| WO | 2012074529 A1 | 6/2012 |

OTHER PUBLICATIONS

Manual entitled "IBM Netezza Database User's Guide", dated Oct. 5, 2012.*

(Continued)

*Primary Examiner* — Mahesh Dwivedi
(74) *Attorney, Agent, or Firm* — Arnold B. Bangali

(57) ABSTRACT

A computer-implemented method for minimizing join operation processing time within a database system based on estimated joined table spread of the database system has been provided. The computer-implemented method includes, estimating value distribution of data in a joined table, wherein the joined table is a result of join operation between two instances of tables of a database system. The computer-implemented method further includes determining boundaries for partitioning at least one range of attributes of the estimated value distribution, wherein the boundaries for partitioning at least one range of attributes of the estimated value distribution corresponds to a same number of rows of the joined table. The computer-implemented method further includes determining at least one assignment of the determined partition of the at least one range of attributes to processing units of the database system.

6 Claims, 7 Drawing Sheets

(56) References Cited

U.S. PATENT DOCUMENTS

| | | | | |
|---|---|---|---|---|
| 2010/0114870 A1* | 5/2010 | Al-Omari | ......... | G06F 17/30445 707/718 |
| 2011/0029507 A1* | 2/2011 | Au | ................. | G06F 17/30498 707/714 |
| 2011/0137890 A1* | 6/2011 | Bestgen | ............ | G06F 17/30466 707/719 |
| 2013/0232133 A1* | 9/2013 | Al-Omari | ......... | G06F 17/30498 707/714 |
| 2014/0149388 A1* | 5/2014 | Gruszecki | ......... | G06F 17/30469 707/714 |
| 2014/0156635 A1* | 6/2014 | Grochowski | ..... | G06F 17/30466 707/714 |
| 2015/0186465 A1 | 7/2015 | Gaza et al. | | |
| 2015/0186466 A1 | 7/2015 | Gaza et al. | | |

OTHER PUBLICATIONS

Ross, et al.; "Optimal Splitters for Database Partitioning with Size Bounds"; ICDT 2009; Mar. 23-25, 2009; Saint Petersburg, Russia; Copyright 2009.

Oracle, "Oracle Database", http://docs.oracle.com/cd/B19306_01/server.102/b14223/toc.htm, select: Full Partition-Wise Joins: Range-Range and List-List, pp. 1-32.

Oracle, "Oracle Datawarehouse", http://oracle-datawarehousing.blogspot.com/2011/02/partial-partition-wise-joins.html, Partial Partition-Wise Joins: Range, pp. 1-3, Accsessed on Jun. 18, 2014.

German Application No. 102014225771.9, filed Dec. 12, 2014, entitled "Avoidance of Intermediate Data Skew in a Massive Parallel Processing Environment" pp. 1-43.

\* cited by examiner

AVOIDANCE OF INTERMEDIATE DATA SKEW IN A MASSIVE PARALLEL PROCESSING ENVIRONMENT

FIELD OF THE INVENTION

The present invention relates generally to the field of database computing systems. More specifically, the present invention is related to a method and system for avoiding intermediate data skew processing in a massive parallel processing (MPP) environment using range partitioning in order to cluster data within processing units for further processing.

BACKGROUND

A database engine (or storage engine) is an underlying software component that a database management system (DBMS) uses to create, read, update, and delete (CRUD) data from a database computing system. A database engine can also be adapted to prepare an execution plan which can be optimized before execution of the query of the database engine. Such optimization of the database engine is performed based on several processed information. Further, in case of a massive parallel processing (MPP) environment of the database computing system, an important dimension of the MPP environment is distribution of data of the database computing system among all processing units of the database computing system. In a MPP environment, data can be distributed several times during a single query execution of the database computing system. For example, the process of data redistribution is required for JOIN operation of the database computing system. For instance, the JOIN operator is one of the set operations available in relational databases. The JOIN operation specifies how to relate tables in a query of the database computing system. Further, such redistribution of data between processing units of the database computing system during the query execution may lead to intermediate data skew of the redistributed data. Intermediate data skew involves cases where one of the processing units of the database computing system received significantly more data than other processing units of the database computing system and, as a result, the database computing system allocates additional time to complete processing operations of the database computing system.

SUMMARY

In one embodiment of the present invention, a computer-implemented method for minimizing join operation processing time within a database system based on estimated joined table spread of the database system is provided. The method comprises estimating, by one or more processors, value distribution of data in a joined table, wherein the joined table is a result of join operation between two instances of tables of a database system. The method further comprises determining, by the one or more processors, boundaries for partitioning at least one range of attributes of the estimated value distribution, wherein the boundaries for partitioning at least one range of attributes of the estimated value distribution corresponds to a same number of rows of the joined table. The method further comprises determining, by the one or more processors, at least one assignment of the determined partition of the at least one range of attributes to processing units of the database system.

In yet another embodiment, a computer system for minimizing join operation processing time within a database system based on estimated join table spread of the database system is provided. The computer system comprises one or more processors, one or more computer-readable memories, one or more computer-readable tangible storage devices, and program instructions which are stored on at least one of the one or more storage devices for execution by at least one of the one or more processors via at least one of the one or more memories. The computer system further comprises program instructions to estimate value distribution of data in a joined table, wherein the joined table is a result of join operation between two instances of tables of a database system. The computer system further comprises program instructions to determine boundaries for partitioning at least one range of attributes of the estimated value distribution, wherein the boundaries for partitioning at least one range of attributes of the estimated value distribution corresponds to a same number of rows of the joined table. The computer system further comprises program instructions to determine at least one assignment of the determined partition of the at least one range of attributes to processing units of the database system.

In yet another embodiment, a computer program product for minimizing join operation processing time within a database system based on estimated joined table spread of the database system. The computer program product comprises one or more computer-readable tangible storage devices and program instructions stored on at least one of the one or more storage devices. The computer program product program further comprises instructions to estimate value distribution of data in a joined table, wherein the joined table is a result of join operation between two instances of tables of a database system. The computer program product further comprises instructions to determine boundaries for partitioning at least one range of attributes of the estimated value distribution, wherein the boundaries for partitioning at least one range of attributes of the estimated value distribution corresponds to a same number of rows of the joined table. The computer program product further comprises program instructions to determine at least one assignment of the determined partition of the at least one range of attributes to processing units of the database system.

BRIEF DESCRIPTION OF THE SEVERAL VIEWS OF THE DRAWINGS

Novel characteristics of the invention are set forth in the appended claims. The invention will be best understood by reference to the following detailed description of the invention when read in conjunction with the accompanying Figures, wherein like reference numerals indicate like components, and:

DETAILED DESCRIPTION

Figure 1:
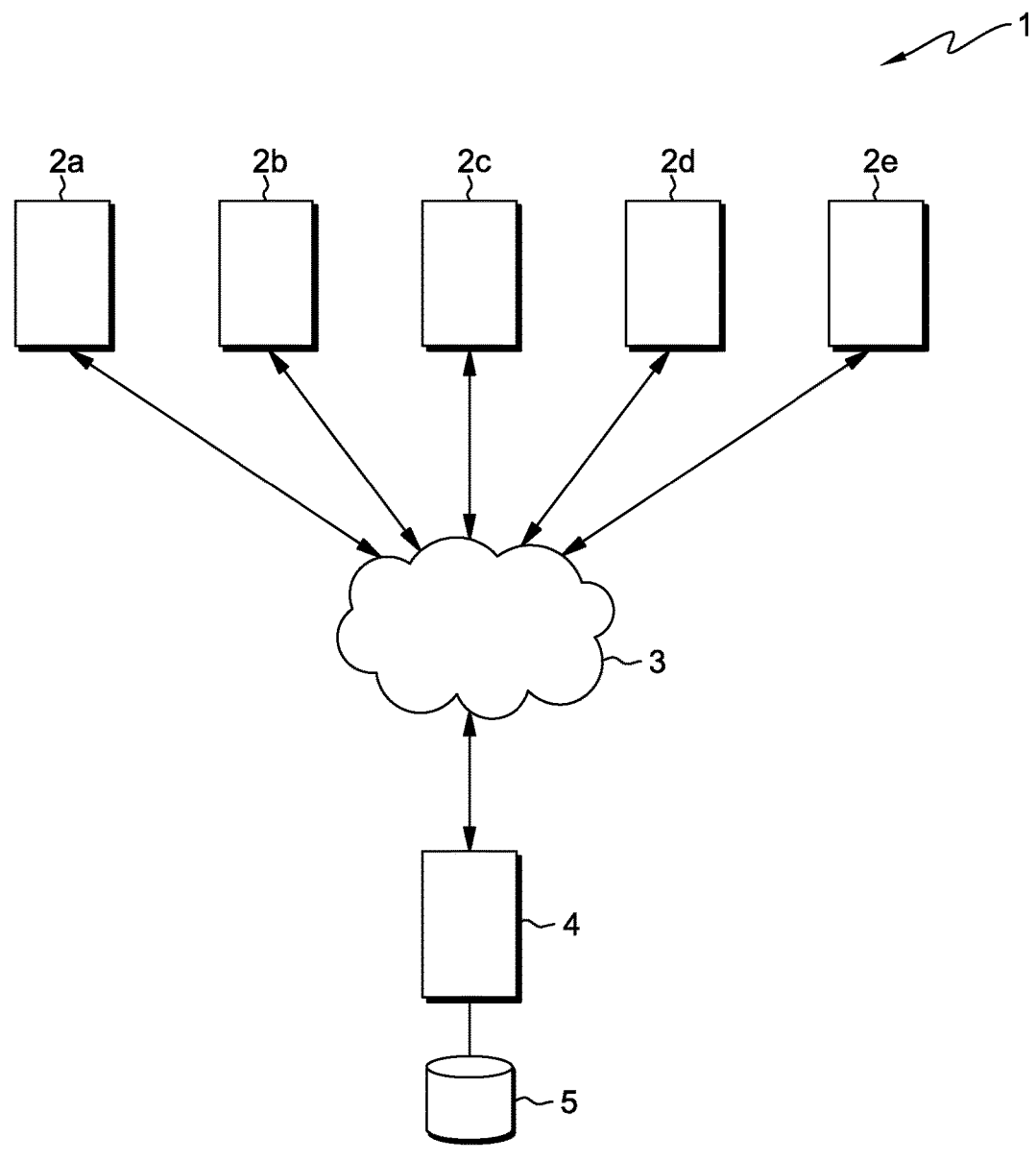
FIG. 1 is a conventional architecture of a client-server of a massive parallel processing (MPP) data warehouse environment 1 for sending requests to a database system 5, in accordance with embodiments of the present invention.

Embodiments of the present invention comprise an approach for minimizing intermediate data skew and minimizing the amount of data exchanged between processing units during a Structured Query Language (SQL) JOIN operation processing within a massive parallel processing (MPP) data warehouse environment. According to at least one embodiment, the present invention comprises a range partitioning functionality, for example an adaptive hash function, that is used for data distribution within processing units of the MPP data warehouse environment, in accordance with embodiments of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodies therein, for example, in baseband or as part of a carrier wave. Such a propagated signal may take any of a variety of forms, including, but not limited to, electro-magnetic, optical, or any other suitable combination thereof. A computer-readable signal medium may be a computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing. Computer program code for carrying out operations for aspects of the present invention may be written in any combination of one or more programming languages, including an object-oriented program language such as Java, Smalltalk, C++ or the like and conventional procedural programming languages, such as the "C" programming language or similar programming languages. The program code may execute entirely on the user's computer, partly on the user's computer, or entirely on the remote computer or server. In the latter scenario, the remote computer may be connected to the user's computer through any type of network, including local area network (LAN) or a wide area network (WAN), or the connection may be made to an external computer (for example, through the Internet using an Internet Service Provider).

The present invention will now be described in accordance with the Figures. Referring to FIG. 1, a conventional architecture of a client-server of massive parallel processing (MPP) data warehouse environment 1 for sending requests to a database system 5 is illustrated. A plurality of clients 2a-2e is connected to the network 3. In addition, a server 4, which acts as a database client, is connected to the network 3 as well. The network 3, which may be composed from several sub-networks, enables the clients 2a-2e and server 4 to communicate with each other. For example, the client 2a sends a request to the server 4 over the network 3 for accessing the database system 5. The server 4 may receive multiple requests from multiple clients and typically processes them in the order of receipt, or in other cases, according to a predefined prioritization policy. Requests queued in the server 4 wait their turn to be processed by the server 4. Once processed by the server 4, the response to the request is sent to the clients 2a-2e. A request entered into the relational database system may result in multiple operations being performed. Multiple JOIN operations can especially be performed in several different orders without changing the result of the query, but the execution order may affect the query performance in a tremendous way. Therefore, relational database systems, including, for example, database system 5, typically comprise a component for optimizing multiple JOIN operations, called query optimizer (10), i.e. to determine a proper order of the JOIN operations which leads to a minimum of execution time, as described in more details below, in accordance with embodiments of the present invention.

Network 3 includes one or more networks of any kind that can provide communication links between various devices and computers connected together within the MPP data warehouse environment 1. Network 3 can also include connections, such as wired communication links, wireless communication links, or fiber optic cables. Network 3 can also be implemented as a number of different types of networks, including, for example, a local area network (LAN), wide area network (WAN), or a packet switched telephone network (PSTN), or some other networked system. For example, MPP data warehouse environment 1 can utilize the Internet with network 3 representing a worldwide collection of networks. According to aspects of the present invention, the term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the World Wide Web (the Web).

One of the most important piece of information for choosing the proper order of database system 5 is to estimate the number of rows of the resulting table after the JOIN operation, hereinafter also referred to as JOINed table. In the following, the first table comprising at least a first data column is represented by R, and the second table comprising at least a second data column is represented by S. The JOINed table which is the result of the JOIN operation based on R and S is denoted by T. The number of rows of the JOINed table is basically affected by the number of rows of the data columns R, S, and the spread of data within the tables, i.e. the number or frequency of distinct values within the data columns R, S.

According to the invention, the number of rows of the JOINed table is estimated based on value distributions, for example using density distribution functions $f(x)$, $g(x)$, wherein the first value distribution/density distribution function $f(x)$ is representing the spread of data within the first data column R, and the second value distribution/density distribution functions $g(x)$ is representing the spread of data within the second data column S. The density distribution functions $f(x)$, $g(x)$ are integrable functions on the whole domain of possible values. Assuming the density function $f(x)$ has been already defined, obtaining the exact number of rows of the correlated table R meeting a certain criteria, e.g. $x_{min} < x < x_{max}$ can be calculated by integrating $f(x)$:

$$\int_{Xmin}^{Xmax} f(x) dx; \qquad \text{(formula 1)}$$

Approximated value distributions, for example density distribution functions $f(x)$, $g(x)$, can be derived by using a query feedback algorithm. At the beginning it is assumed that the data are evenly spread across all values between $x_{min}$ and $x_{max}$. So, at the beginning $f(x)$ is represented by a constant value, which can be calculated by:

$$f(x) = \frac{\text{total number of rows in the table}}{|x_{max} - x_{min}|} = const.; \qquad \text{(formula 2)}$$

After execution of a query based on the table R, i.e. select . . . from R where attribute<value1 (value1 ∈ [$x_{min}$; $x_{max}$]), an information about the exact number of rows k contained within the range x<value1 can be deduced. So, the density distribution functions $f(x)$ is evaluated by resolving the following equation (assuming the linear independence of the sub-equations):

$$\begin{cases} \int_{Xmin}^{Xmax} f(x) dx = \text{total number of rows in the table} \\ \int_{Xmin}^{value1} f(x) dx = k \end{cases} \qquad \text{(formula 3)}$$

Using the query feedback algorithm, each time a new query is executed, a new condition is added to the equation defining the density distribution. In a generalized way, the formula can be written as:

$$\begin{cases} \int_{x_0^0}^{x_1^0} f(x) = k_0 \\ \int_{x_0^1}^{x_1^1} f(x) = k_1 \\ \quad \ldots \\ \int_{x_0^{M-1}}^{x_1^{M-1}} f(x) = k_{M-1} \end{cases} \qquad \text{(formula 4)}$$

$$M \in N$$

In other words, by usage of the query feedback algorithm, single values of the exact density distribution function $f(x)$ are determined. The feedback of those values is used to gather, and preferably, improve the density distribution function $f(x)$. To derive an integrable function needed for calculating the number of rows (cf. formula 1), the exact density distribution function $f(x)$ is approximated by a polynomial with order (M-1) using M derived values. The polynomial may have the following structure:

$$f(x) = a_0 + a_1 x + a_2 x^2 + \ldots + a_{M-1} x^{M-1} \qquad \text{(formula 5)}$$

A person skilled in the art is able to obtain the polynomial based on the set of values M derived by using the upper mentioned query feedback algorithm. The density distribution function $g(x)$ of the second data column S is determined in the same manner by using query feedback algorithm. As a result, the number of rows of the columns R, S containing a certain range of numerical values can be estimated by integrating the respective density distribution function $f(x)$, $g(x)$ within the respective range. A second aspect which influences the number of rows of a JOINed table T is the number of unique values $u_1$, $u_2$ within the first and second data column R, S to be JOINed. The number of rows of the first and second data column R, S can be estimated by using a sample of data, by determining the number of unique values $u_1$, $u_2$ within the sample of data, and by extrapolating the number of unique values within the whole column by using the information gathered for the sample, i.e. for the subset of data. Preferably, the data are sampled during the query execution, i.e. the information is gathered just in time during query execution of MPP data warehouse environment 1.

According to aspects of the present invention, density function is one way of representing calculation of number of rows in a particular period of database system 5. Further, according to at least one aspect, assume that processing unit level statistics are available and executed by a query optimizer of database system 5. For example, in this manner, database system 5 is adaptive to estimate how many tables rows within certain periods are stored on particular processing units of database system 5. Specifically, the estimation by database system 5 allows estimation calculation of how many table's rows within certain periods are stored on particular processing units of database system 5. This can be presented in the following way, as a vector of density functions:

$$(f_1, f_2, \ldots, f_n)_A^{HashFunction} \qquad \text{(formula 6)}$$

Wherein, formula 6 is represented, as such: A is subset of columns of the table used as hash key for the distribution. Hash function or adaptive hash function is a data partitioning mechanism of database system 5 that allows data redistribution of database system 5 within MPP data warehouse environment 1, wherein the hash function is adaptive to evenly spread value of processing nodes of database system 5. The HashFunction (formula 6) and 'A' uniquely determined data distribution within processing units of database system 5. Further, n is a number of processing units available for computations of database system 5, and $f\_i$ is a density function for data stored on processing unit number i. Further, according to at least one embodiment, assume that there is a way of estimating the data spread in the JOINed table, created as an output of JOIN operation within two input tables of database system 5. In this manner, it can be assumed exits estimated density function for a column of JOINed table on which JOIN was performed. Also, for further reference, density function of JOINed table can be identified by $f\_jt$.

According to at least one embodiment of the present invention, determining database redistribution of database system 5 is based on the following conditions: first, determination of JOINed table rows on every processing unit of database system 5 that are equal, and second, determination of amount of data exchanged between processing units before JOIN operation is minimal within database system 5, wherein determination of the first and the second conditions is represented by the hash function of database system 5. The hash function is one example of how to define boundaries for range partitioning.

$$\text{Hash Function}(x) = \begin{cases} z_1 & \text{when } x \in [x_1, x_2), \\ z_2 & \text{when } x \in [x_2, x_3), \\ \ldots \\ z_n & \text{when } x \in [x_n, x_{n+1}) \end{cases} \quad \text{(formula 7)}$$

Wherein, formula 7 is represented as such: $\{z\_i\}$ are processing unit numbers, and domain of table's column= $[x\_1, x\_\{n+1\}]$, with the following two properties: First, after redistributing both input tables with it and performing JOIN operation system of database system 5, it will have almost equal number of JOINed table on each processing unit of database system 5, and second, data movement or utilization of data of database system 5 caused by harsh function of formula 7 is minimal. In order to achieve first and second criteria or conditions of formula 7 for database redistribution, database system 5 determines split of column of domain of database system 5, and database system 5 also assigns periods of the determined split to particular processing units of database system 5.

According to at least one embodiment, database system 5 determines split of the column's domain based on determination of domain split of database system 5, wherein with every partition of column's domain includes the same number of rows from JOINed table, based on the ability for database system to calculate the density function for JOINed table ($f\_jt$) before performing the JOIN itself, set of n−1 (where n is number of processing units) values $\{x\_i\}$ is obtained such as:

$$\begin{cases} \int_{x_{min}}^{x_1} f_{jt}(x)dx = K \\ \int_{x_1}^{x_2} f_{jt}(x)dx = K \\ \ldots \\ \int_{x_{n-1}}^{x_{max}} f_{jt}(x)dx = K \end{cases} \quad \text{(formula 8)}$$

Wherein, formula 8 is represented by K, which is the average number of rows of JOINed table per processing unit of database system 5:

$$K = \frac{\int_{x_{min}}^{x_{max}} f_{jt} dx}{n} \quad \text{(formula 9)}$$

Wherein, $f\_jt$ is density function for JOINed table, n—number of processing units and $x\_min < \ldots < x\_\{i-1\} < x\_i < \ldots < x\_max$.

According to yet another embodiment, database system 5 assigns the periods of the determined split to particular processing units of database system 5. For example, a determination of such periods assignment includes an amount of data transmitted between processing units of database system 5. As discussed, objects of hash functions of database system 5 can be defined as a vector processing unit level density functions for first table column of database system 5 (formula 10) and also, a vector processing units level density functions for a second table column (formula 11):

$$(f_1, f_2, \ldots, f_n)_A^{HashFunction1} \quad \text{(formula 10)}$$

$$(g_1, g_2, \ldots, g_n)_B^{HashFunction2} \quad \text{(formula 11)}$$

For example, according to at least one embodiment, formula 10 and formula 11 are adapted to define existing JOIN operation tables redistributions of database system 5. Specifically, formula 10 and formula 11 reflects the processing of rows of tables that are spread across processing units BEFORE JOIN operation of database system 5. For instance, amount of data from first table which is needed to be sent from processing unit i to processing unit assigned to period $[x\_k, x\_k+1]$, assuming redistribution based on calculated in step 1 domain split, can be represented as follow:

$$\int_{x_k}^{x_{k+1}} f_i \quad \text{(formula 12)}$$

Hence, to find the periods→processing units assignment which will fulfill second condition for first table, database system 5 determines such permutation $(p\_1, \ldots, p\_n)$ of $(1, \ldots, n)$ vector that following sum is minimal:

$$\underbrace{\sum_{k=1}^{k=n} \left( \sum_{i=1}^{i=n} \int_{x_k}^{x_{k+1}} f_i \right)}_{\text{all rows which need to be moved from each processing unit to the rest of processing units}} - \quad \text{(formula 13)}$$

$$\underbrace{\left( \int_{x_1}^{x_2} f_{p_1} + \ldots + \int_{x_n}^{x_{n+1}} f_{p_n} \right)}_{\text{reduced by all data which will stay in place}}$$

In formula 13, it can be noticed that permutation is equal to finding permutation for which second part of formula 13 is maximal. Similarly, for a second table the an equation can be maximized as follows:

$$\Sigma_{k=1}^{k=n} (\int_{x_k}^{x_{k+1}} (f_{p_k} + g_{p_k})) \quad \text{(formula 14)}$$

According to at least one embodiment of the present invention, the above problem can be resolved in many different ways. One approach can include counting sum for all possible permutations, wherein the processing units of database system 5 is constant; hence, the number of possible permutations is also constant from computational complexity point of view. Further, once permutation is determined, the determined hash function can be represented by the following equation:

$$\text{Hash Function}(x) = \begin{cases} p_1 & \text{when } x \in [x_1, x_2), \\ p_2 & \text{when } x \in [x_2, x_3), \\ \ldots \\ p_n & \text{when } x \in [x_n, x_{n+1}) \end{cases} \quad \text{(formula 15)}$$

Adaptive hash function of formula 15 can ensure even data redistribution of data within database system 5 and allows to avoidance or decrease in intermediate processing skew impact on the query execution time of database system 5. For example, an adaptive hash function of formula 15 can be utilized in the following manner: According to at least one embodiment, consider a scenario wherein a query optimizer program of database system 5 is executed on database system 5 as follows:

select . . . from TABLE1,TABLE2 where
TABLE1.col1=TABLE2.col2

In this case, the query optimizer program performs JOIN operation based on plan redistribution of the TABLE1 and TABLE2 among all processing units in such a way that rows from TABLE1 and TABLE2 with the same value in col1 and col2, respectively, are on the same processing unit of database system 5. For example, a common approach is to use a predefined hash function which will map values from col1 and col2 to the # of the processing unit. Further, in this case, a defined hash function can spread the values evenly, wherein every processing unit gets more or less the same number of distinct values. Further, according to at least one embodiment, during query execution, after redistributing the data among the processing unit of database system 5, JOIN operation is performed.

Quite often, in this phase, database system 5 is dealing with intermediate processing skew, wherein the intermediate processing skew involves processing units of distinct values, as depicted in Table 1:

TABLE 1

| TABLE1.col1 values | processing units | TABLE2.col2 values |
|---|---|---|
| 1, 1, 2 | ⇒ 1 ⇐ | 1, 2, 2 |
| 3, 4, 4, 4, 5, 6, 6 | ⇒ 2 ⇐ | 6 |
| 9, 9, 9, 9 | ⇒ 3 ⇐ | 9, 9 |
| 12, 13, 17 | ⇒ 4 ⇐ | 13, 13 |
| 43 | ⇒ 5 ⇐ | 43, 43 |
| 44, 44 | ⇒ 6 ⇐ | 44, 45 |
| 55, 78 | ⇒ 7 ⇐ | 45, 55, 99 |

It can be noticed that the processing unit of Table 1 includes 1 or 2 distinct values, wherein, system is operating processing skew—$4^{th}$ processing unit needs to process significantly larger number of rows. In this case, an adaptive hash function of formula 15 can calculate the density function for JOINed table (f_jt), set of n−1 (where n is number of processing units) values {x_i} is obtained such as:

$$\begin{cases} \int_{x_{min}}^{x_1} f_{jt}(x)dx = K \\ \int_{x_1}^{x_2} f_{jt}(x)dx = K \\ \ldots \\ \int_{x_{n-1}}^{x_{max}} f_{jt}(x)dx = K \end{cases} \quad \text{(formula 16)}$$

Wherein, formula 16 is represented as such: K which is the average number of rows of JOINed table per processing unit:

$$K = \frac{\int_{x_{min}}^{x_{max}} f_{ji} dx}{n}$$

wherein: f_jt is density function for JOINed table; n—number of processing units; and x_min< . . . <x_{i−1}<x_i< . . . <x_max.

In all, as discussed in formula 15, an adaptive hash function is defined as follows:

$$f(x) = \begin{cases} 1 & \text{when } x \in [x_{min}, x_1), \\ 2 & \text{when } x \in [x_1, x_2), \\ \ldots \\ n & \text{when } x \in [x_{n-1}, x_{max}), \end{cases} \quad \text{(formula 15)}$$

According to at least one embodiment, as described above, an adaptive hash function defined in such a way ensures even data redistribution of database system 5, but from JOINed table perspective, every processing unit should get more or less the same amount of rows from the result of the JOIN operation and allows avoidance or decrease of intermediate processing skew impact on the query execution time of database system 5. As an example, consider a modified version of Table 1 and Table 2, based on an adaptive hash function of formula 15:

TABLE 2

| TABLE1.col1 values | processing units | TABLE2.col2 values |
|---|---|---|
| 1, 1, 2 | ⇒ 1 ⇐ | 1, 2, 2 |
| 3, 4, 4, 4, 5, 6, 6 | ⇒ 2 ⇐ | 6 |
| 9, 9, 9, 9 | ⇒ 3 ⇐ | 9, 9 |
| 12, 13, 17 | ⇒ 4 ⇐ | 13, 13 |
| 43 | ⇒ 5 ⇐ | 43, 43 |

TABLE 2-continued

| TABLE1.col1 values | processing units | TABLE2.col2 values |
|---|---|---|
| 44, 44 | ⇒ 6 ⇐ | 44, 45 |
| 55, 78 | ⇒ 7 ⇐ | 45, 55, 99 |

According to at least one embodiment, processing unit $4^{th}$ of Table 2, was relived or modified based on hash function of formula 15.

Figure 2:
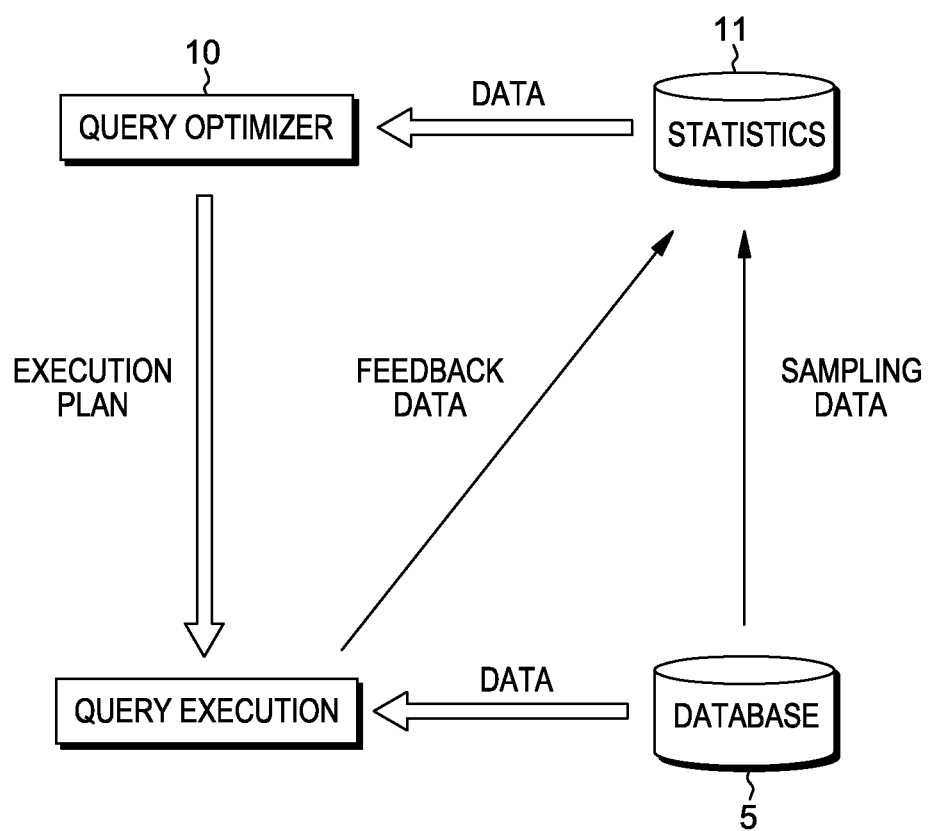
FIG. 2 depicts a schematic flow chart depicting the data flow within the database system. A statistics unit 11 is storing statistical information, in accordance with embodiments of the present invention.

FIG. 2 depicts a schematic flow chart depicting the data flow within the database system, in accordance with embodiments of the present invention. A statistics unit 11 is storing statistical information. The statistical information can be derived by sampling the data or by using query feedback. For example, statistical information comprise the number of unique values obtained by sampling the data or information about the exact number of rows k obtained by using query feedback algorithm.

The statistical information can be provided to the query optimizer 10, which preferably gathers an execution plan based on statistical information. The execution plan preferably defines the order of cascaded JOIN operations to optimize the query performance. The way of deriving information about the best order of cascaded JOIN operations by using statistical information is described in the following disclosure. Finally, the query is executed based on the execution plan provided by the query optimizer 10.

Figure 3:
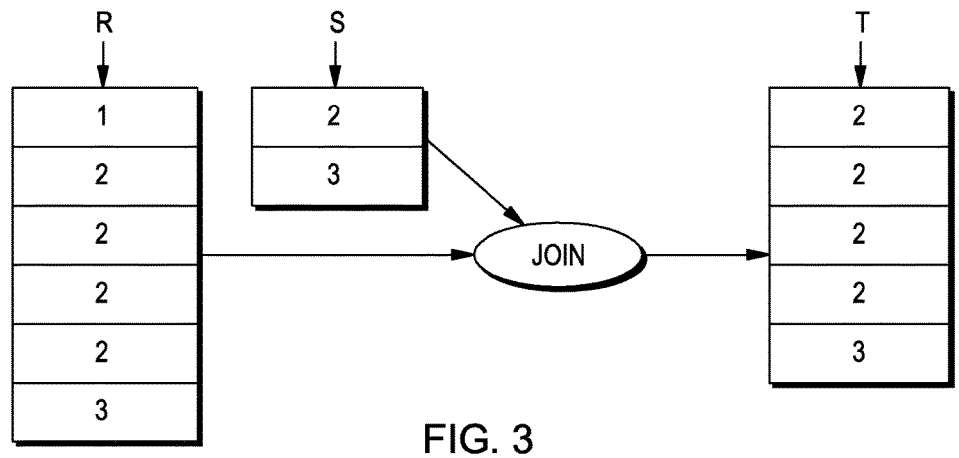
FIG. 3 depicts an example for joining first and second data column R, S by the most commonly used inner-JOIN-operation, in accordance with embodiments of the present invention.

FIG. 3 depicts an example for JOINing first and second data column R, S by the most commonly used inner-JOIN operation, in accordance with embodiments of the present invention. The resulting JOINed table T is also shown. To estimate the number of rows of the JOINed table by using an inner-JOIN operation, i.e. the resulting JOINed table T contains all values, which are contained in both tables to be JOINed, the following equation can be used:

$$F(a,b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} * \max(u_1^i, u_2^i) \right) \quad \text{(formula 6)}$$

wherein
$x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the JOIN.
$u_1^i$: number of unique values of the first data column R in the respective interval i;
$u_2^i$: number of unique values of the second data column S in the respective interval i;
F(a,b): estimated number of rows of the resulting JOINed table T by JOINing first and second data column R, S in the interval [a,b].

The first term $$\frac{\max\left(\int_{x_i}^{x_{i+1}} f(x)dx, 0\right)}{u_1^i}$$

within formula 6 represents the average number of rows per unique value in the $[x_i; x_{i+1}]$-section for the first data column R, the second term $$\frac{\max\left(\int_{x_i}^{x_{i+1}} g(x)dx, 0\right)}{u_2^i}$$

within formula 6 represents the average number of rows per unique value in the $[x_i; x_{i+1}]$-section for the second data column S. The third term max $(u_1^i, u_2^i)$ is for deriving the maximum value of the numbers of unique values contained in the $[x_i; x_{i+1}]$-sequences of the first and second data column.

Formula 6 can be simplified in the following way:

$$F(a,b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i) \quad \text{(formula 7)}$$

$$= \sum_{i=0}^{n-1} \left( \max\left(\int_{x_i}^{x_{i+1}} f(x)dx, 0\right) * \max\left(\int_{x_i}^{x_{i+1}} g(x)dx, 0\right) \right) * \frac{\max(u_1^i, u_2^i)}{u_1^i * u_2^i}$$

$$= \sum_{i=0}^{n-1} \frac{\max\left(\int_{x_i}^{x_{i+1}} f(x)dx, 0\right) * \max\left(\int_{x_i}^{x_{i+1}} g(x)dx, 0\right)}{\min(u_1^i, u_2^i)};$$

According to formulas 6 and 7, the interval between the starting row a and the end row b is sub-divided in n sections or segments, wherein n is a natural number N. Preferably the sections are chosen according to the roots of the first and second density distribution function f(x), g(x), i.e. the set of $x_i$ contains at least all roots of the first and second density distribution function f(x), g(x). To adjust the accuracy of the result of the estimation of number of rows of the JOINed table T, i.e. to adjust the accuracy of the JOIN estimation to the required level, the number of sections n can be adapted. For achieving a high accuracy, the number of sections n is increased. In contrary, in cases where a JOIN estimation with a lower accuracy is acceptable, the number of sections n can be decreased.

The number of sections n can also be determined in a more sophisticated way. The differential of the density distribution function can be used to determine the stiffness of the density distribution function. Preferably the following equation could be used to determine the beginning of the next section:

$$x_i = x_{i-1} + \frac{c}{|f'(x_{i-1})|} \quad \text{(formula 8)}$$

wherein
$x_i$=starting value of next section;
$x_{i-1}$=starting value of actual section;
c=constant over the hole domain [a, b];
f'(x)=differential of the density distribution function f(x).
The main advantage of using the stiffness of the density distribution function to determine the section grid is that regions with a high stiffness of density function are correlated with smaller sections and regions with a lower stiffness are represented by major sections.

Figure 4:
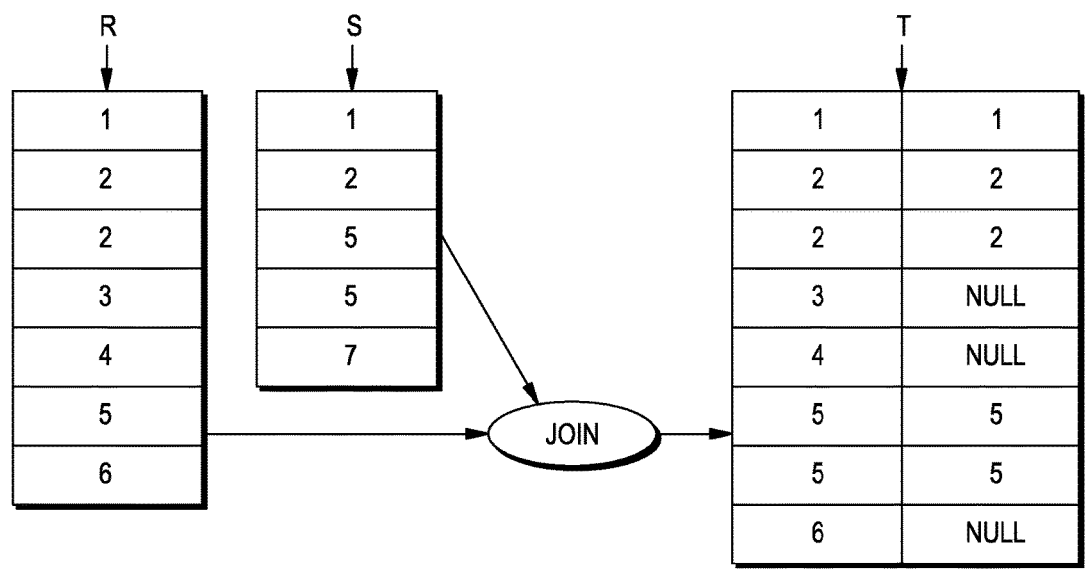
FIG. 4 illustrates an example for JOINing first and second data column R, S by left-outer-JOIN-operation is shown, in accordance with embodiments of the present invention.

FIG. 4 illustrates an example for JOINing first and second data column R, S by left-outer-JOIN operation as shown, in accordance with embodiments of the present invention. For example, in left-outer-JOIN operation we have to consider intervals in which second data column S does not have rows. In other words, if there is a row with value A in first data column R, and there is no such row in second data column S, resulting JOINed table T will contain this row with "nulls" in the columns taken from second data column S.

To estimate the number of rows of the JOINed table T by using a left-outer-JOIN operation, the following equation can be used:

$$F(a,b) = \sum_{i=0}^{n-1} \left( \frac{\max\left(\int_{x_i}^{x_{i+1}} f(x)dx, 0\right)}{u_2^i} * \frac{1}{\max\left(\int_{x_i}^{x_{i+1}} g(x)dx, 0\right)} \right) * \max(u_1^i, u_2^i) \quad \text{(formula 9)}$$

The difference between formula 9 (left-outer-JOIN operation case) and formula 6 (inner-JOIN operation case) is the value "1" instead of value "0" in the second maximum function. The reason for that are the cases where there are no rows in the second table in the respective sequence $[x_i; x_{i+1}]$. In those cases all rows from first data column R with null on the right side should be included into resulting JOINed table T (cf. FIG. 4).

Formula 9 can be simplified in the following way:

$$F(a,b) = \sum_{i=0}^{n-1} \left( \frac{\max\left(\int_{x_i}^{x_{i+1}} f(x)dx, 0\right)}{u_1^i} * \frac{1}{\max\left(\int_{x_i}^{x_{i+1}} g(x)dx, 1\right)} \right) * \quad \text{(formula 10)}$$

$$\max(u_1^i, u_2^i)$$

$$= \sum_{i=0}^{n-1} \left( \max\left(\int_{x_i}^{x_{i+1}} f(x)dx, 0\right) * \max\left(\int_{x_i}^{x_{i+1}} g(x)dx, 1\right) \right) *$$

$$\frac{\max(u_1^i, u_2^i)}{u_1^i * u_2^i}$$

$$= \sum_{i=0}^{n-1} \left( \frac{\max\left(\int_{x_i}^{x_{i+1}} f(x)dx, 0\right) *}{\max\left(\int_{x_i}^{x_{i+1}} g(x)dx, 1\right)} \right)$$

$$\approx \sum_{i=0}^{n-1} \max\left(\int_{x_i}^{x_{i+1}} f(x)dx, 0\right) *$$

$$\max\left(\frac{\int_{x_i}^{x_{i+1}} g(x)dx}{\min(u_1^i, u_2^i)}, 1\right)$$

The case of right-outer-JOIN operation is similar to the left-outer-JOIN operation in the way that we have to consider intervals in which first data column R does not have rows. In other words, if there is a row with value A in second data column S, and there is no such row in first data column R, resulting JOINed table T will contain this row with "nulls" in the columns taken from the first data column R.

To estimate the number of rows of the JOINed table T by using an right-outer-JOIN operation, the following equation can be used:

$$F(a,b) = \sum_{i=0}^{n-1} \left( \max\left(\frac{\int_{x_i}^{x_{i+1}} f(x)dx, 1}{u_1^i}\right) * \max\left(\frac{\int_{x_i}^{x_{i+1}} g(x)dx, 0}{u_2^i}\right) \right) * \quad \text{(formula 11)}$$

$$\max(u_1^i, u_2^i)$$

$$= \sum_{i=0}^{n-1} \left( \max\left(\int_{x_i}^{x_{i+1}} f(x)dx, 1\right) * \max\left(\int_{x_i}^{x_{i+1}} g(x)dx, 0\right) \right) * \frac{\max(u_1^i, u_2^i)}{u_1^i * u_2^i}$$

$$= \sum_{i=0}^{n-1} \frac{\max\left(\int_{x_i}^{x_{i+1}} f(x)dx, 1\right) *}{\max\left(\int_{x_i}^{x_{i+1}} g(x)dx, 0\right)}$$

$$\approx \sum_{i=0}^{n-1} \max\left(\frac{\int_{x_i}^{x_{i+1}} f(x)dx}{\min(u_1^i, u_2^i)}, 1\right) *$$

$$\max\left(\int_{x_i}^{x_{i+1}} g(x)dx, 0\right)$$

Comparing formula 11 with formula 10, formula 11 is the reversed image of formula 10.

Also cross-JOIN operations can be estimated by using the concept according to the invention. By using the cross-JOIN operation, all rows of the first data column R will be JOINed with all rows of the second data column S. Cross-JOIN operation returns the Cartesian product of rows from columns in the JOIN. In other words, it will produce rows which combine each row from the first data column R with each row from the second data column S. Therefore, the number of rows of the cross-JOINed table T can be estimated using the following equation:

$$F(a,b) = \sum_{i=0}^{n-1} \max(\int_{x_i}^{x_{i+1}} f(x)dx, 0) \cdot \sum_{i=0}^{m-1} \max(\int_{y_i}^{y_{i+1}} g(x)dx, 0) \quad \text{(formula 12)}$$

wherein
$x_0 = y_0 = a$;
$x_n = y_m = b$;
$x_i, y_i \in [a, b]$;
It is worth noting that in formulas 6, 7, 9, 10 and 11 the number of unique value $u_1, u_2 \neq 0$.

In a second embodiment of the invention, the number of rows of the JOINed table T is also determined based on statistical information derived out of samples of the first and second data columns R, S, but the samples are used for calculating the exact number of rows of a sample-JOINed table, which is the result of JOINing both samples and extrapolating the derived result to the whole section or domain.

To estimate the number of rows of the JOINed table T according to the second embodiment of the invention, the following equation can be used:

$$F(a,b) = \sum_{i=0}^{n-1} F(S_1^i, S_2^i) * \left( \frac{\int_{x_i}^{x_{i+1}} f(x)dx}{|s_1^i|} * \frac{\int_{x_i}^{x_{i+1}} g(x)dx}{|s_2^i|} \right) \quad \text{(formula 13)}$$

wherein
$x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the JOIN;
$S_1^i$: samples randomly chosen from section $[x_i; x_{i+1}]$ from the first data columns R;
$S_2^i$: samples randomly chosen from section $[x_i; x_{i+1}]$ from the second data columns S;
$F(S_1^i, S_2^i)$: exact number of rows by applying a JOIN operation on the samples $S_1^i$ and $S_2^i$;
$|S_1^i|, |S_2^i|$: number of values within the samples;
F(a,b): estimated number of rows of the resulting JOINed table by JOINing first and second data column R, S in the interval [a,b].

The first term $F(S_1^i, S_2^i)$ within formula 13 represents the exact calculation of number of rows of the JOINed table based on samples of data, the second term $$\frac{\int_{x_i}^{x_{i+1}} f(x)dx}{|s_1^i|}$$

represents a factor expressing how many times the set of data contained in the section $[x_i; x_{i+1}]$ of the first data column R is bigger than the sample of data of the first data column R, and the third term $$\frac{\int_{x_i}^{x_{i+1}} g(x)dx}{|s_2^i|}$$

represents a factor expressing how many times the set of data contained in the section $[x_i; x_{i+1}]$ of the second data column S is bigger than the sample of data of the second data column S. The main advantage of the second embodiment is that it can be used for all kinds of JOIN operations. It is only required to calculate the JOIN of the sample data based on the respective JOIN operation to be estimated.

Figure 5:
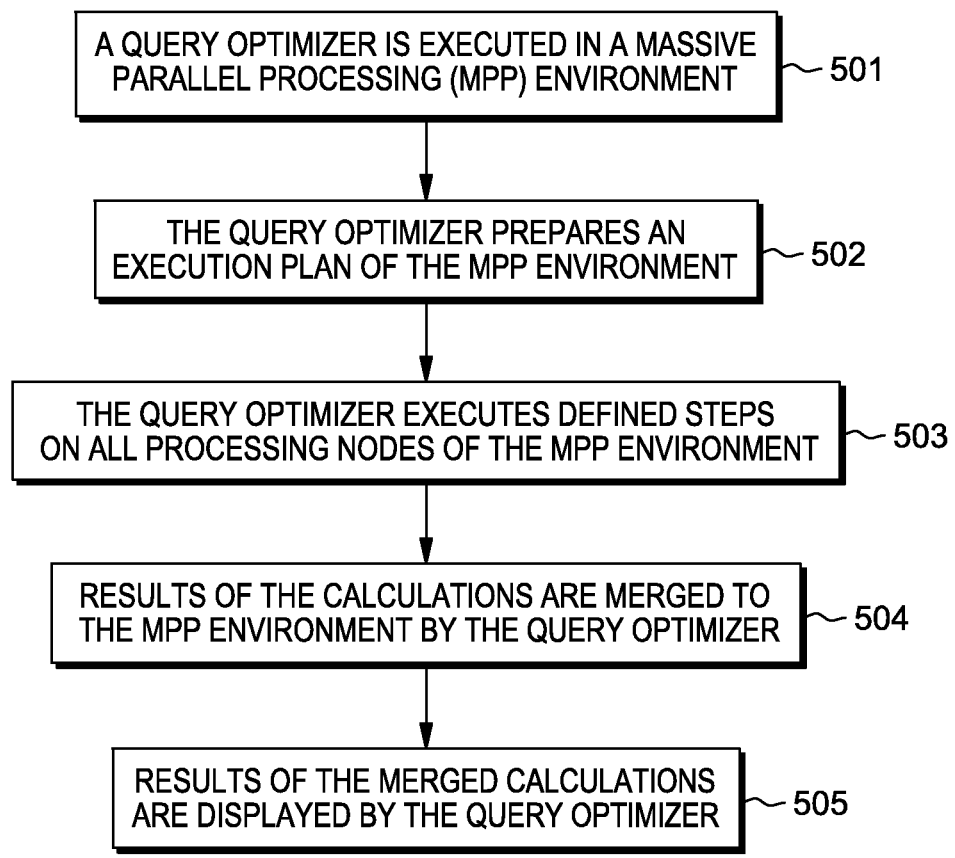
FIG. 5 is a flow diagram depicting steps performed by query optimizer program for executing processing nodes within a MPP data warehouse environment, in accordance with embodiments of the present invention.

FIG. 5 is a flow diagram depicting steps performed by query optimizer program for executing processing nodes within MPP data warehouse environment 1, in accordance with embodiments of the present invention. Query optimizer 10 is executed within MPP data warehouse environment 1 (Step 501). According to at least one embodiment of the present invention, query optimizer 10 can be executed directly within MPP data warehouse environment 1 based on program command lines of MPP data warehouse environment 1, or query optimizer 10 can be executed remotely by one or more system applications or drivers of MPP data warehouse environment 1.

Query optimizer 10 prepares an execution plan for executing processing nodes within MPP data warehouse environment 1 (Step 502). For example, query optimizer 10 can prepare the execution plan based on a defined set of rules, or statistics of stored data of MPP data warehouse environment 1. Query optimizer 10 executes defined steps on all processing nodes of MPP data warehouse environment 1 (Step 503). Partial results of the calculations from all processing units of MPP data warehouse environment 1 are transmitted and merged into final results (Step 504). Final results of the calculations are transmitted as a query result to MPP computing environment for executing processing nodes within MPP data warehouse environment 1 (Step 505).

Figure 6:
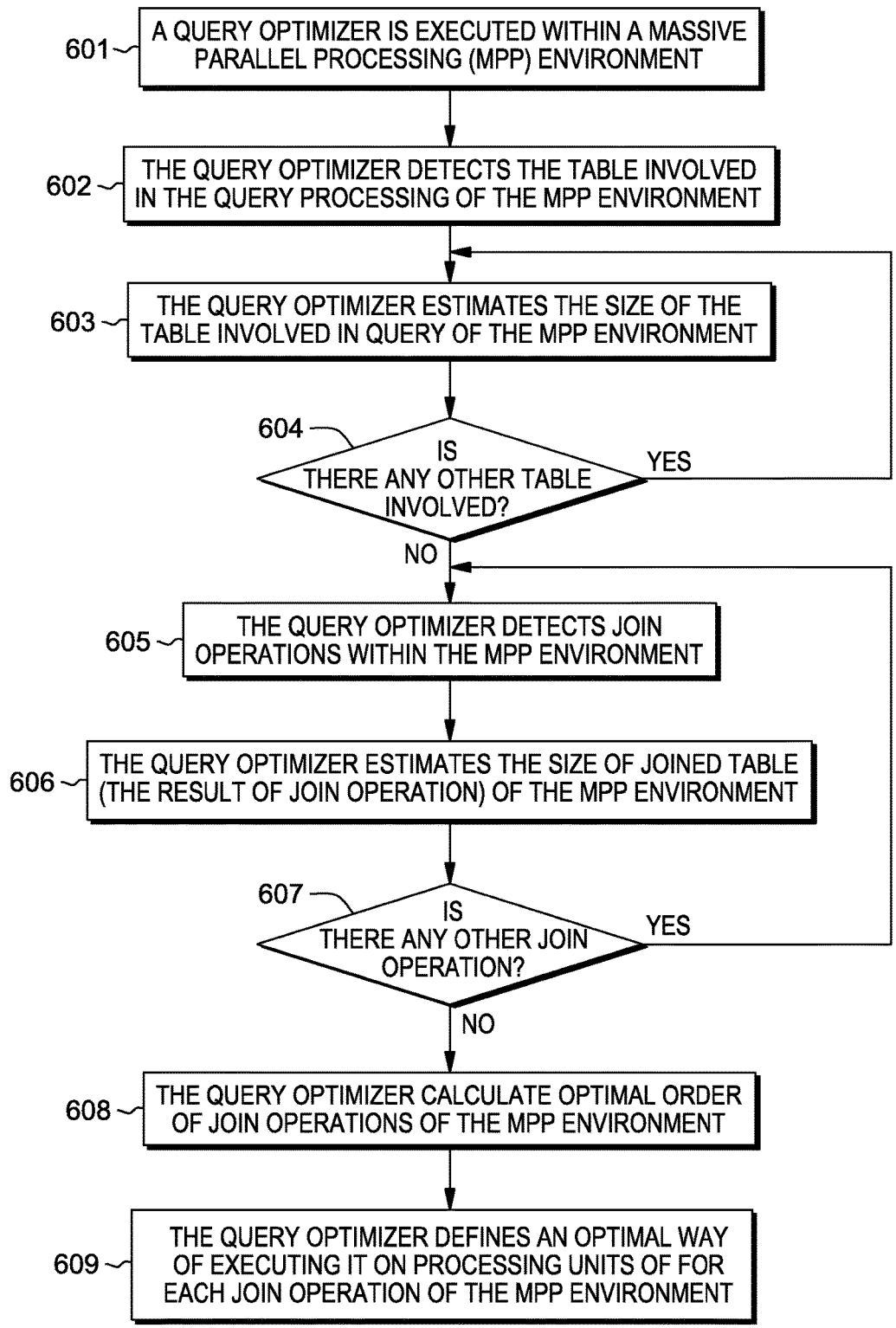
FIG. 6 is a flow diagram depicting steps performed by a query optimizer for preparing execution plan for a query of a database of a MPP data warehouse environment, in accordance with embodiments of the present invention.

FIG. 6 is a flow diagram depicting steps performed by query optimizer 10 for preparing an execution plan for a query of database system 5 of MPP data warehouse environment 1, in accordance with embodiments of the present invention. Query optimizer 10 is executed within MPP data warehouse environment 1 (Step 601). Query optimizer 10 detects all tables involved in the query processing of MPP data warehouse environment 1 (Step 602). Query optimizer 10 estimates the size of the table involved in the query of MPP data warehouse environment 1 (Step 603). At decision 604, query optimizer 10, determines whether there are any other tables involved in the query of MPP data warehouse environment 1. Query optimizer 10 detects JOIN operations within MPP data warehouse environment 1. (Step 605). Query optimizer 10 estimates the size of JOINed table, or the result of JOIN operation of MPP data warehouse environment 1 (Step 606). At decision 607, query optimizer 10 determines if there are any other JOIN operations in an execution plan of MPP data warehouse environment 1. Query optimizer 10 calculates optimal order of JOIN operations of MPP data warehouse environment 1 (Step 608). Query optimizer 10 defines an optimal way of executing processing units for each JOIN operation of MPP data warehouse environment 1 (Step 609).

Figure 7:
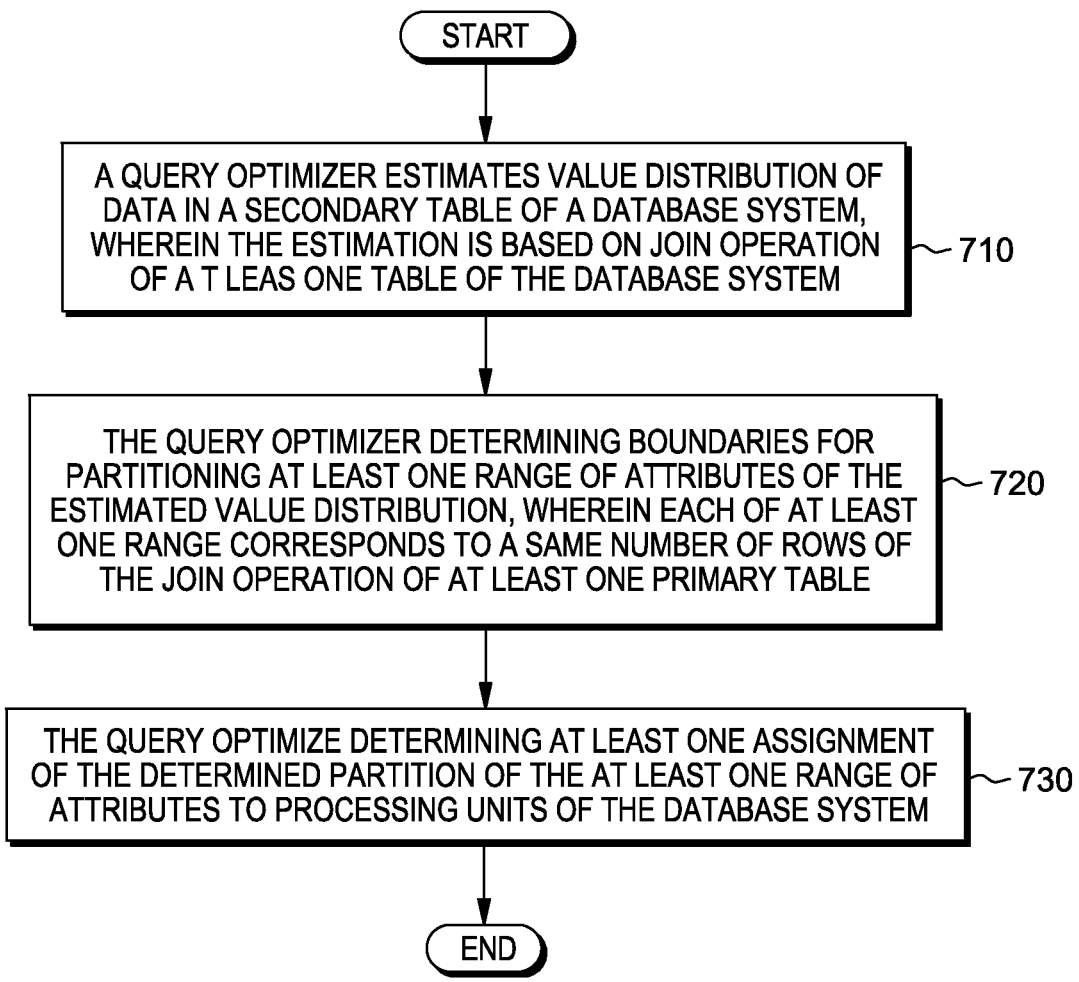
FIG. 7 is a flow diagram depicting steps performed by a query optimizer for minimizing join operation processing time within database system 5 based on estimated JOINed table spread of a database system 5 of a MPP data warehouse environment, in accordance with embodiments of the present invention.

FIG. 7 is a flow diagram depicting steps performed by query optimizer 10 for minimizing JOIN operation processing time within database system 5 based on estimated JOINed table spread of database system 5 of MPP data warehouse environment 1, in accordance with embodiments of the present invention. Query optimizer 10 estimates value distribution of data in a joined table, wherein the joined table is a result of join operation between two instances of tables of database system 5. (Step 710). For example, according to at least one embodiment, the estimated value distribution data is based on a count of number of rows with particular value of the two instances of the tables of the of the join operation and calculation of number of rows of the joined table of MPP data warehouse environment 1. Moreover, the estimated value distribution data is a density function based on values of columns of the joined table of database system 5.

According to at least one embodiment, query optimizer 10 determines boundaries for partitioning at least one range of attributes of the estimated value distribution, wherein the boundaries for partitioning at least one range of attributes of the estimated value distribution corresponds to a same number of rows of the joined table. (Step 720). Query optimizer 10 determines at least one assignment of the determined partition of the at least one range of attributes to processing units of database system 5. For example, the assignment of the determined partition of the at least one range of attributes is based on defined hash functions of data distribution within the processing units of MPP data warehouse environment 1 (Step 730). Moreover, according to at least one embodiment, the defined hash functions are adaptive to map value of columns within the processing units of MPP data warehouse environment 1. Also, the defined hash functions decreases intermediate processing impact of query execution time of the processing units of a database system of MPP data warehouse environment 1, in accordance with embodiments of the present invention.

Figure 8:
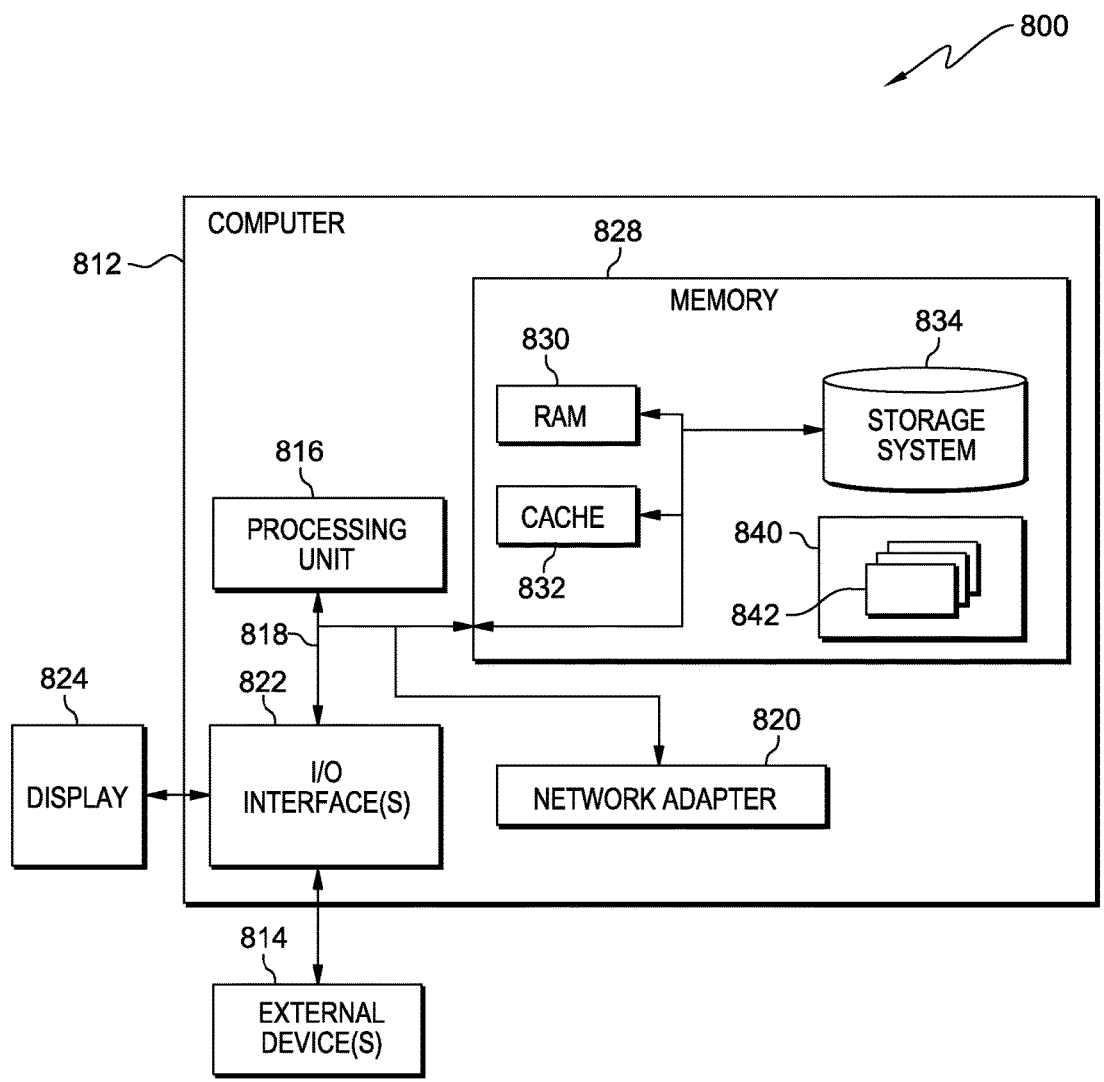
FIG. 8 is a block diagram of a computer system, in accordance with an embodiment of the present invention.

FIG. 8 is a block diagram of a computer system, in accordance with an embodiment of the present invention. Computer system 800 is only one example of a suitable computer system and is not intended to suggest any limitation as to the scope of use or functionality of embodiments of the invention described herein.

Regardless, computer system 800 is capable of being implemented and/or performing any of the functionality set forth hereinabove. In computer system 800 there is computer 812, which is operational with numerous other general purpose or special purpose computing system environments or configurations. Examples of well-known computing systems, environments, and/or configurations that may be suitable for use with computer 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. MPP data warehouse environment 1 can be implemented as an instance of computer 812.

Computer 812 may be described in the general context of computer system executable instructions, such as program modules, being executed by a computer system. Generally, program modules may include routines, programs, objects, components, logic, data structures, and so on that perform particular tasks or implement particular abstract data types. Computer 812 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 8, computer 812 is shown in the form of a general-purpose computing device. The components of computer 812 may include, but are not limited to, one or more processors or processing units 816, memory 828, and bus 818 that couples various system components including memory 828 to processing unit 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 812 typically includes a variety of computer system readable media. Such media may be any available media that is accessible by computer 812, and includes both volatile and non-volatile media, and removable and non-removable media.

Memory 828 includes computer system readable media in the form of volatile memory, such as random access memory (RAM) 830 and/or cache 832. Computer 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Query optimizer 10 can be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Query optimizer 10 can be implemented as an instance of program 840.

Computer 812 may also communicate with one or more external device(s) 814 such as a keyboard, a pointing device, etc., as well as display 824; one or more devices that enable a user to interact with computer 812; and/or any devices (e.g., network card, modem, etc.) that enable computer 812 to communicate with one or more other computing devices. Such communication occurs via Input/Output (I/O) interface(s) 822. Still yet, computer 812 communicates with one or more networks such as a local area network (LAN), a general wide area network (WAN), and/or a public network (e.g., the Internet) via network adapter 820. As depicted, network adapter 820 communicates with the other components of computer 812 via bus 818. It should be understood that although not shown, other hardware and/or software components could be used in conjunction with computer 812. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, microcode, etc.), or an embodiment combining software and hardware aspects that may all generally be referred to herein as a "circuit", "module" or "system". Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing. Computer program code for carrying out operations for embodiments of the present invention may be written in any combination of one or more programming languages, including an object-oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Based on the foregoing a method for minimizing JOIN operation processing time within a database system based on estimated JOINed table spread of the database system have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for minimizing join operation processing time within a database system based on estimated joined table spread of the database system, the computer implemented method comprising the steps of:

estimating, by one or more processors, value distribution of data in a joined table, wherein the joined table is a result of a join operation between two instances of tables of a database system and the estimated value distribution data is based on a count of a number of rows with a particular value of the two instances of the tables of the join operation and calculation of a number of rows of the joined table;

determining, by the one or more processors, boundaries for partitioning at least one range of attributes of the estimated value distribution of data, wherein the boundaries for partitioning is based on a density distribution function of the joined table, and wherein the density distribution function represents a spread of data within a data column of the joined table, the joined table being a result of a join operation between two instances of tables of the database system; and determining, by the one or more processors, at least one assignment of the determined partition of the at least one range of attributes to processing units of the database system;

providing, by the one or more processors, parameterized functions that represent the estimated value distribution;

determining the total number of rows in the join table;

determining, by the one or more processors, a set of estimates for the number of rows in the join table in a first set of consequent common attribute value ranges based on the parameterized functions;

determining, by the one or more processors, a parametrized function representing the value distribution of the common attribute in the join table by solving a first equation system involving definite integrals of over the first set of consequent attribute ranges and the set of estimates for numbers of rows; and determining, by the one or more processors, a second set of consequent common attribute value ranges by solving a second equation system involving definite integrals of over the second set of consequent common attribute value ranges, each definite integral equaling the total number of rows in the join table divided by the number of processing nodes.

2. The computer-implemented method according to claim 1, wherein the estimated value distribution of data is a density distribution function based on values of columns of the joined table of the database system.

3. The computer-implemented method according to claim 2, further includes: splitting, by the one or more processors, the joined table, into at least one partitioning range of attributes of the estimated value distribution data.

4. The computer-implemented method according to claim 1, wherein the assignment of the determined partition of the at least one range of attributes is based on defined hash functions of data distribution within the processing units.

5. The computer-implemented method according to claim 4, wherein the defined hash functions are adaptive to map value of columns within the processing units.

6. The computer-implemented method according to claim 5, wherein the defined hash functions decreases intermediate processing impact of query execution time of the processing units of a database system.

* * * * *